US006971747B2

(12) United States Patent
Newell et al.

(10) Patent No.: US 6,971,747 B2
(45) Date of Patent: *Dec. 6, 2005

(54) IMAGE DISPLAY DEVICE HAVING A COMPENSATING PRISM GROUP

(75) Inventors: Michael P. Newell, Santa Rosa, CA (US); Clark Pentico, Simi Valley, CA (US)

(73) Assignee: JDS Uniphase Corporation, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/022,247

(22) Filed: Dec. 23, 2004

(65) Prior Publication Data

US 2005/0105059 A1    May 19, 2005

Related U.S. Application Data

(63) Continuation of application No. 10/213,505, filed on Aug. 6, 2002, now Pat. No. 6,851,812.

(60) Provisional application No. 60/310,077, filed on Aug. 6, 2001.

(51) Int. Cl.$^7$ .............................................. G03B 21/14
(52) U.S. Cl. ............................. 353/3; 353/69; 353/81
(58) Field of Search .............................. 353/31, 33, 34, 353/37, 81, 20, 69; 349/5, 7, 8, 9

(56) References Cited

U.S. PATENT DOCUMENTS 3,637,308 A    1/1972    Van Raalte et al.
3,868,168 A    2/1975    De Veer
3,982,819 A    9/1976    Letellier
4,864,390 A    9/1989    McKechnie et al.
4,928,914 A    5/1990    Snodell (Continued)

FOREIGN PATENT DOCUMENTS

WO        0 658 794 A2    6/1995

(Continued)

*Primary Examiner*—William C. Dowling
(74) *Attorney, Agent, or Firm*—Allen, Dyer, Doppelt, Milbrath & Gilchrist, P.A.

(57) ABSTRACT

A color management system for use with projection displays includes, for example, a separating polarizing beamsplitter, a compensating prism group, an image assimilator, and a combining polarizing beam splitter. In accordance with an exemplary embodiment, the separating polarizing beamsplitter receives a bi-oriented light input and separates it into two output beams, one comprising a first component and the other comprising a second component. The image assimilator receives an output light beam from the separating polarizing beamsplitter, transmits the light output to one or more corresponding microdisplays, receives one or more modified outputs from the microdisplays, and emits an output comprising those modified outputs to a combining polarizing beamsplitter. The compensating prism group receives from the separating polarizing beamsplitter the other output light beam, transmits it to another corresponding microdisplay, receives from the microdisplay a modified light output, and transmits it to the combining polarizing beamsplitter be combined with the light output from the image assimilator. The compensating prism group may be configured to compensate for an optical aberration induced by the light separator.

23 Claims, 7 Drawing Sheets

U.S. PATENT DOCUMENTS

| | | |
|---|---|---|
| 5,127,617 A | 7/1992 | Bergetz |
| 5,231,431 A | 7/1993 | Yano et al. |
| 5,268,775 A | 12/1993 | Zeidler |
| 5,295,009 A | 3/1994 | Barnik et al. |
| 5,315,330 A | 5/1994 | Hamada |
| 5,327,289 A | 7/1994 | Watanabe et al. |
| 5,374,968 A | 12/1994 | Haven et al. |
| 5,383,641 A | 1/1995 | Bergetz |
| 5,486,881 A | 1/1996 | Hwang |
| 5,487,524 A | 1/1996 | Bergetz |
| 5,552,922 A | 9/1996 | Magarill |
| 5,562,334 A | 10/1996 | Wortel |
| 5,621,486 A | 4/1997 | Doany et al. |
| 5,658,060 A | 8/1997 | Dove |
| 5,701,203 A | 12/1997 | Watanabe |
| 5,775,665 A | 7/1998 | Haskin et al. |
| 5,790,910 A | 8/1998 | Haskin |
| D400,085 S | 10/1998 | Haskin |
| 5,917,561 A | 6/1999 | Hatanaka |
| 5,946,114 A | 8/1999 | Loiseaux et al. |
| 5,973,759 A | 10/1999 | Itoh et al. |
| 6,120,153 A | 9/2000 | Ohta |
| 6,176,585 B1 | 1/2001 | Koyama et al. |
| 6,176,586 B1 | 1/2001 | Hirose et al. |
| 6,183,090 B1 | 2/2001 | Nakanishi et al. |
| 6,183,091 B1 | 2/2001 | Johnson et al. |
| 6,231,190 B1 | 5/2001 | Dewald |
| 6,234,634 B1 | 5/2001 | Hansen et al. |
| 6,273,568 B1 | 8/2001 | Okuyama |
| 6,309,071 B1 | 10/2001 | Huang et al. |
| 6,384,972 B1 | 5/2002 | Chuang |
| 6,419,362 B1 | 7/2002 | Ikeda et al. |
| 6,454,416 B2 | 9/2002 | Aoto et al. |
| 6,457,831 B1 | 10/2002 | Chuang et al. |
| 6,490,087 B1 | 12/2002 | Fulkerson et al. |
| 6,513,934 B1 | 2/2003 | Okuyama |
| 6,545,804 B2 | 4/2003 | Chuang |
| 6,585,378 B2 | 7/2003 | Kurtz et al. |
| D478,088 S | 8/2003 | Hamouz |
| 6,601,957 B2 | 8/2003 | Sugawara |
| D480,100 S | 9/2003 | Lam |
| 6,624,862 B1 | 9/2003 | Hayashi et al. |
| 6,626,540 B2 | 9/2003 | Ouchi et al. |
| 6,661,475 B1 | 12/2003 | Stahl et al. |
| 6,678,015 B2 | 1/2004 | Yi et al. |
| 6,685,322 B2 | 2/2004 | Sawamura et al. |
| D488,708 S | 4/2004 | Lam et al. |
| D489,599 S | 5/2004 | Lam |
| D491,747 S | 6/2004 | Walters |
| 2002/0105602 A1 | 8/2002 | Pan |

FOREIGN PATENT DOCUMENTS

| | | |
|---|---|---|
| WO | WO 99/19758 | 4/1999 |
| WO | WO 00/63738 | 10/2000 |
| WO | WO 01/37030 | 5/2001 |
| WO | WO 01/50178 | 7/2001 |
| WO | WO 01/72048 | 9/2001 |

Dual PBS to minimize stress birefringence caused by uneven thermal loading

IMAGE DISPLAY DEVICE HAVING A COMPENSATING PRISM GROUP

CROSS REFERENCE TO RELATED APPLICATION

This application is a continuation of U.S. patent application Ser. No. 10/213,505 filed Aug. 6, 2002, now U.S. Pat. No. 6,851,812 which claims benefit of priority from U.S. Provisional Application Ser. No. 60/310,077 filed Aug. 6, 2001, which is hereby incorporated by reference.

FIELD OF INVENTION

The present invention relates generally to color management systems for projection displays, and more specifically to systems for separating input illumination into separate color channels to facilitate superimposition of spatial information and for subsequent recombination of the separate color channels to facilitate projection of a full color image.

BACKGROUND OF THE INVENTION

In conjunction with projection displays, it is desirable to employ a color management system, and it is further desirable that such color management systems facilitate production of a high contrast image while accommodating a relatively high level of illuminating flux.

Unfortunately, currently existing color management systems are capable of achieving increased contrast at practical levels of illuminating flux levels only by employing highly specialized materials, resulting in unreasonable increases in cost.

A color management system may function by first separating input light (e.g., white light) into a plurality of color channels traversing the visible spectrum (e.g. red, green and blue) then using the separate color channels to illuminate a plurality of corresponding microdisplays (e.g., LCoS microdisplays) and recombining the color channels to produce an output light (e.g., white light). Where it is desired to project an image in conjunction with the output light beam, spatial information may be superimposed on each of the color channels by the microdisplays prior to recombination. As a result, a full color image may be projected with the output light beam. As used herein, the terms "microdisplay," "panel," and "light valve" refer to a mechanism configured for receiving an incipient light beam, imparting spatial information in the light beam, and emitting a modified light beam comprising the incipient, light beam and the spatial information. For example, model number DILA SX-070 manufactured by the JVC company of Japan.

Prior art color management systems have thus far proven unable to produce high contrast images at low cost without compromising their ability to maintain reasonable quantities of illuminating flux. This is due in part to use of solid "cube-type" polarizing beamsplitters for color separation and recombination. These polarizing beamsplitters are otherwise referred to as MacNeille prisms or cube polarizing beamsplitters. "Cube type" polarizing beamsplitters are inherently susceptible to thermal gradients that typically arise at high flux levels, often causing stress birefringence which results in depolarization of the light and a loss of contrast. As a result, where high contrast images are required, is has been necessary to use costly high-index, low-birefringence glass. Although this solution has proven effective to reduce birefringence at low levels of flux, it is expensive and exhibits reduced effectiveness at eliminating thermally induced birefringence at high flux levels (e.g., greater than approximately 500 lumens).

For example, FIG. 1 illustrates a prior art color management system 100, commonly known as the ColorQuad™ from Colorlink, in which four cube polarizing beamsplitters and five color selective retardation components are used to provide color separation and recombination. In accordance with this system, the input cubic polarizing beamsplitter receives an input light beam 120 and separates it into three components, a green component 121, a blue component 122, and a red component 123. The red component 123 receives spatial information from a red panel 133; the blue component 122 receives spatial information from a blue panel 132; and the green component 121 receives spatial information from a green panel 131. Finally, the output cubic polarizing beamsplitter recombines the red component 123 and blue component 122 with green component 121 to form a full color image 140. It should be noted that at high levels of light flux, cubic polarizing beamsplitter 110 becomes thermally loaded and necessarily distorts physically, causing stress birefringence, which results in depolarization of the light and a loss of contrast.

In an attempt to reduce the adverse effects of the use of cube polarizing beamsplitters, various attempts have been made to implement plate polarizing beamsplitters in place of cube configurations in color management systems. However, these attempts have given rise to other optical aberrations associated with the plate polarizing beamsplitters such as astigmatism.

Accordingly, it would be advantageous to have a color management system that could be used in high flux projection systems while simultaneously functioning in a wide range of thermal environments with reduced birefringence sensitivity and improved durability. It would further be advantageous to have a color management system that could achieve these objectives without requiring costly, high index, low birefringence glass or particular susceptibility to optical aberrations produced by polarizing beamsplitters in plate configurations.

SUMMARY OF THE INVENTION

The methods and apparatus of the present invention address many of the shortcomings of the prior art. In accordance with various aspects of the present invention, improved methods and apparatus provide color management for projection display systems. Effective color management of the present invention is suitable for use in high flux projection systems with improved contrast, birefringence sensitivity and durability, while significantly reducing cost. In addition, the instant invention provides color management suitable for use in adverse thermal environments without requiring costly, high index, low birefringence glass.

In accordance with an exemplary embodiment of the present invention, a color management system includes a light separator, a compensating prism group, and means for forming a comprehensive light output. In accordance with this embodiment, the light separator is positioned to receive a light input comprising a first component and a second component and is configured for separating the first component from the second component and emitting a first light beam comprising the first component and a second light beam comprising the second component.

The compensating prism group is positioned to receive the first light beam and is configured for transmitting the first light beam to be received by a first microdisplay. After the first microdisplay imparts spatial information on the first light beam, producing a modified first light beam, the compensating prism group receives the modified first light beam and emits a compensated light output. This compensated light output comprises the modified first light beam and also compensates for optical aberrations induced by the light separator, and/or any other optical component that may cause an optical aberration, as well as any other optical phenomena that may benefit from compensation. Finally, the color management system of the present invention includes means for forming a comprehensive light output from the compensated light output and a complementary light output comprising the second light beam.

In an exemplary embodiment, the light separator includes a filter positioned to receive a broad-spectrum light input and configured to selectively rotate a component of the light to emit light oriented in two planes. In this embodiment, the light separator further comprises a polarizing beamsplitter positioned to receive the bi-oriented light and to separate it into two light outputs. In one embodiment, these light outputs include a first light beam comprising a first component and a second light beam comprising one or more additional components.

In another exemplary embodiment, the color management system includes an image assimilator positioned to receive from the light separator the second beam and configured to separate it into two output beams, each comprising a distinct component. The image assimilator then transmits each of the output beams to a corresponding microdisplay and receives a modified beam from each of the microdisplays, the modified beams including superimposed spatial information. Finally, the image assimilator produces an output comprising the modified outputs from the microdisplays.

As used herein, the term "component" refers to a portion of a light transmission. For example, where a light transmission contains light of various wavelengths in the visible spectrum (e.g., blue, red, and green) the light transmission may be separated into a plurality of components, each corresponding to a range of wavelengths (i.e., color bands) each approximating a color band, such as blue, red, or green, in the visible spectrum. As a further example a light transmission may comprise polarized light oriented in one or more planes.

In accordance with an exemplary embodiment of the invention, the image assimilator may comprise a dichroic prism. Alternatively, the image assimilator may comprise a polarizing filter and a polarizing beamsplitter. In accordance with this embodiment, the polarizing filter produces a differentiated light output comprising second and third components having differing orientations. The second polarizing beamsplitter receives the differentiated light output and separates it into a plurality of outputs, each having a different color component, for transmitting to a plurality of corresponding microdisplays.

In accordance with another exemplary embodiment of the present invention, the compensating prism group may comprise a pair of prism compensators arranged to be separated by an air gap configured to compensate for one or more optical aberrations produced by the polarizing beamsplitter. Optionally, the compensating prism group may also exhibit a tilted orientation or may incorporate a tilted compensator plate.

In accordance with another exemplary embodiment of the present invention, the color management system may also include a filter (e.g., a color selective retarder element) and an analyzer for improving contrast in the projected image.

The function of the color selective retarder element is to selectively rotate the appropriate color bands so that the emerging light is substantially linearly polarized and further that the polarization axis for each color band is substantially the same. The filter and analyzer may be positioned to receive light output from both the image assimilator and the compensating prism group. Optionally, depending on the characteristics of the color selective retardation element, the analyzer may remove light of a predetermined wavelength or band of wavelengths from the light output. Finally, the color management system may include a projection lens for projecting an output light beam containing spatial information for projecting an image.

Accordingly, the use of a prism compensator group enables the color management system to effectively employ a polarizing beamsplitter configured as a plate rather than a cube as in the prior art. Moreover, the present invention may employ both polarization dependent elements and dichroic elements to split an input light into a plurality of color bands upon which spatial information may be superimposed by a corresponding plurality of microdisplays, the modified color bands being recombined to produce a full color projected image.

BRIEF DESCRIPTION OF THE DRAWINGS

The above-mentioned objects and features of the present invention can be more clearly understood from the following detailed description considered in conjunction with the following drawings, in which like numerals represent like elements and in which.

DETAILED DESCRIPTION

The present invention may be described herein in terms of various functional elements and/or various processing steps. It should be appreciated that such functional elements may be realized by any number of software, hardware, electrical, optical or structural elements configured to perform the specified functions. For example, the present invention may employ various optical and/or digital electrical elements, whose values may be suitably configured for various intended purposes. In addition, the present invention may be practiced in any optical application. However, for purposes of illustration only, exemplary embodiments of the present invention will be described herein in connection with projection displays. Further, it should be noted that while various elements may be suitably coupled or connected to other elements within exemplary optical systems, such connections and couplings can be realized by direct connection between elements, or by connection through other elements and devices located thereinbetween.

As discussed above, prior art color management systems suffer from shortcomings such as limitation in light intensity, high cost, poor image contrast, excessive birefringence sensitivity, and lack of durability. Prior art attempts to overcome these shortcomings have involved use of costly high-index, low-birefringence glass. Yet, despite the use of these expensive materials, thermally induced birefringence remains a problem at light intensity levels greater than approximately 500 lumens.

In accordance with various aspects of the present invention, an improved color management system is provided that provides color management suitable for use in adverse thermal environments without requiring costly, high index, low birefringence glass. In accordance with an exemplary embodiment of the present invention, input illumination light is split into a plurality of different color bands and then recombined after superimposition of spatial information by a corresponding plurality of microdisplays and compensation for optical aberrations as provided by a compensating prism group, thereby producing a full color image. As a result, effective color management of the present invention is suitable for use in high lumen projection systems with reduced cost, improved contrast, reduced birefringence sensitivity, and improved durability. In addition, the instant invention provides color management suitable for use in adverse thermal environments without requiring costly, high index, low birefringence glass.

Figure 1:
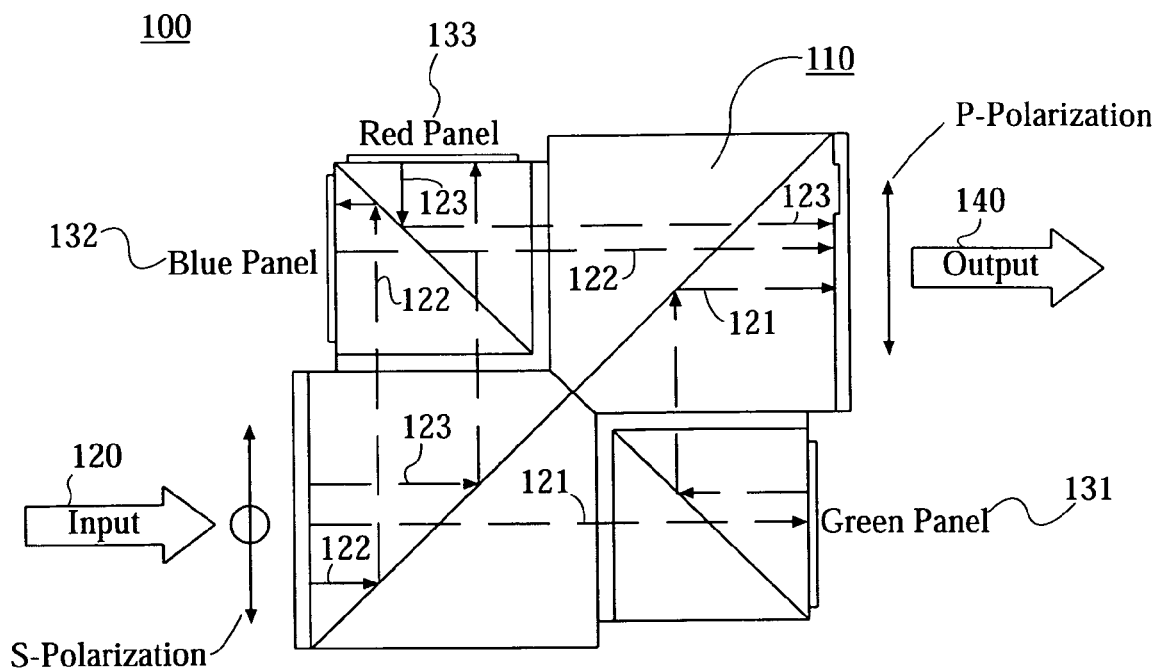
FIG. 1 illustrates a prior art color management system.
Figure 2:
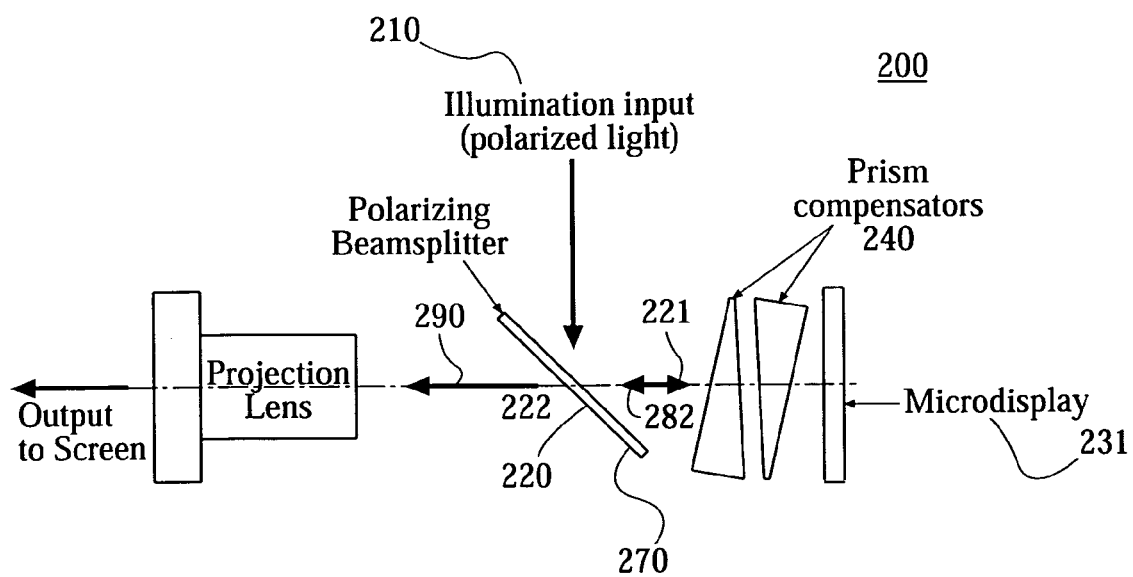
FIG. 2 illustrates a single panel color management system in accordance with an exemplary embodiment of the present invention.

In one embodiment, with reference to FIG. 2, an exemplary color management system 200 includes a light separator 220, a compensating prism group 240, and means 270 for forming a comprehensive light output 290. In accordance with an exemplary embodiment, light separator 220 is positioned to receive a light input 210 comprising a first component and a second component. Light separator 220 is configured for separating said first component from said second component and emitting a first light beam 221 comprising said first component and a second light beam 222 comprising said second component. It should be noted that light separator 220 may comprise a polarizing beamsplitter configured for separating light oriented in a first plane from light oriented in a second plane and emitting a first light beam comprising light oriented in the first plane and a second light beam comprising light oriented in the second plane.

In accordance with an exemplary embodiment, compensating prism group 240 is positioned to receive first light beam 221, and the compensating prism group 240 is configured for transmitting the first light beam 221 to be received by a first microdisplay 231. In addition, compensating prism group 240 is configured for receiving a modified first light beam from the first microdisplay 231 and emitting a compensated light output 282. In accordance with an exemplary embodiment of the present invention, compensated light output 282 comprises the modified first light beam and compensates for an optical aberration induced by the light separator 220.

Figure 4:
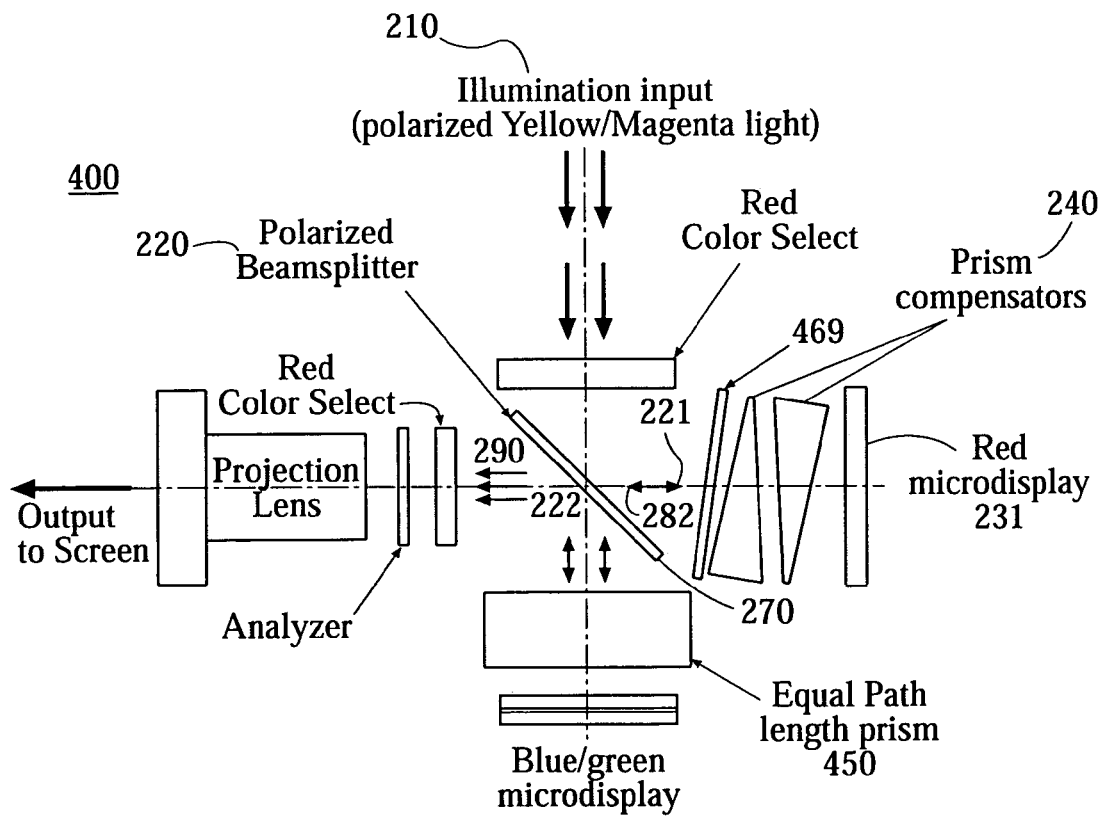
FIG. 4 illustrates a dual panel color management system in accordance with another exemplary embodiment of the present invention, wherein the compensating prism group is tilted and the image assimilator is a substantially equal path length prism.

In accordance with an exemplary embodiment, compensating prism group 240 comprises a pair of prism compensators. It should be noted that these prism compensators may be arranged to be separated by an air gap. The size of the air gap depends upon the thickness and orientation of the light separator, typically lying being between one and four millimeters, and in an exemplary embodiment, being substantially 2.5 millimeters. Further, the air gap may be configured for compensating for one or more optical aberrations. In accordance with another exemplary embodiment of the present invention, as shown in FIG. 4, compensating prism group 240 may exhibit a tilted orientation. For example, compensating prism group may be oriented at an angle of between −30 degrees and +30 degrees. In an exemplary embodiment, compensating prism group may be oriented at an angle of approximately 15 degrees. Further still, compensating prism group 240 may comprise a tilted compensator plate 469 that exhibits a tilted orientation. For example, tilted compensator plate may be oriented at an angle of between −30 degrees and +30 degrees. In an exemplary embodiment, tilted compensator plate may be oriented at an angle of approximately 15 degrees. Finally, compensating prism group may be configured to exhibit an equivalent optical path length substantially equal to an that of the polarizing beamsplitter.

In an exemplary embodiment, the invention also includes means 270 for forming a comprehensive light output from the compensated light output 282 and a complementary light output 222 comprising the second light beam 222. In an exemplary embodiment, the means 270 for forming a comprehensive light output 290 comprise a polarizing beamsplitter 270, which may be the same element, and serve the same function, as the light separator 220.

As used herein, the term "filter" refers to an optical filter configured to discriminate (i.e., block or permit to pass or alter the polarization properties of light flux based on physical characteristics of the light, such as wavelength, orientation, polarization, or flash or field rate) and may be constructed using any technique known in the art such as, for example, embedding an optically active material such as a spectrally sensitive optical retardation film in or on an otherwise transparent substrate or placing a plurality of very thin wires in parallel orientation to one another leaving thin gaps through which light may pass to produce polarized light. Examples of filters configured for discriminating light based upon its physical characteristics include dichroic plates manufactured by OCLI of Santa Rosa, Calif. and Unaxis of Liechtenstein, ColorSelect filters manufactured by ColorLink of Boulder, Colo., and ProFlux polarizers and polarizing beamsplitters manufactured by Moxtek of Orem Utah.

Figure 6:
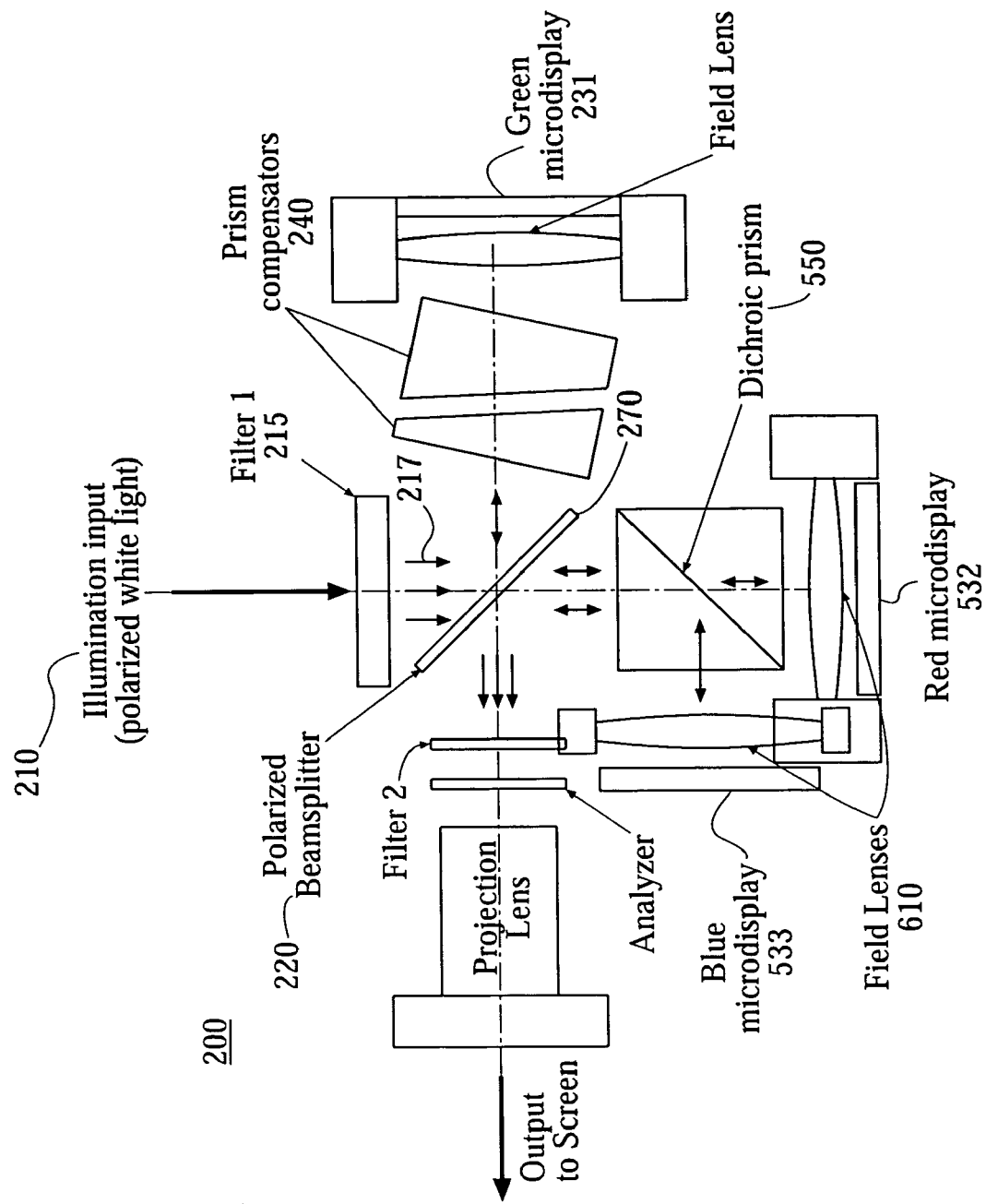
FIG. 6 illustrates a three panel color management system incorporating a plurality of field lenses positioned to receive and focus the component light beams so as to reduce the diameter of the light beams.
Figure 7:
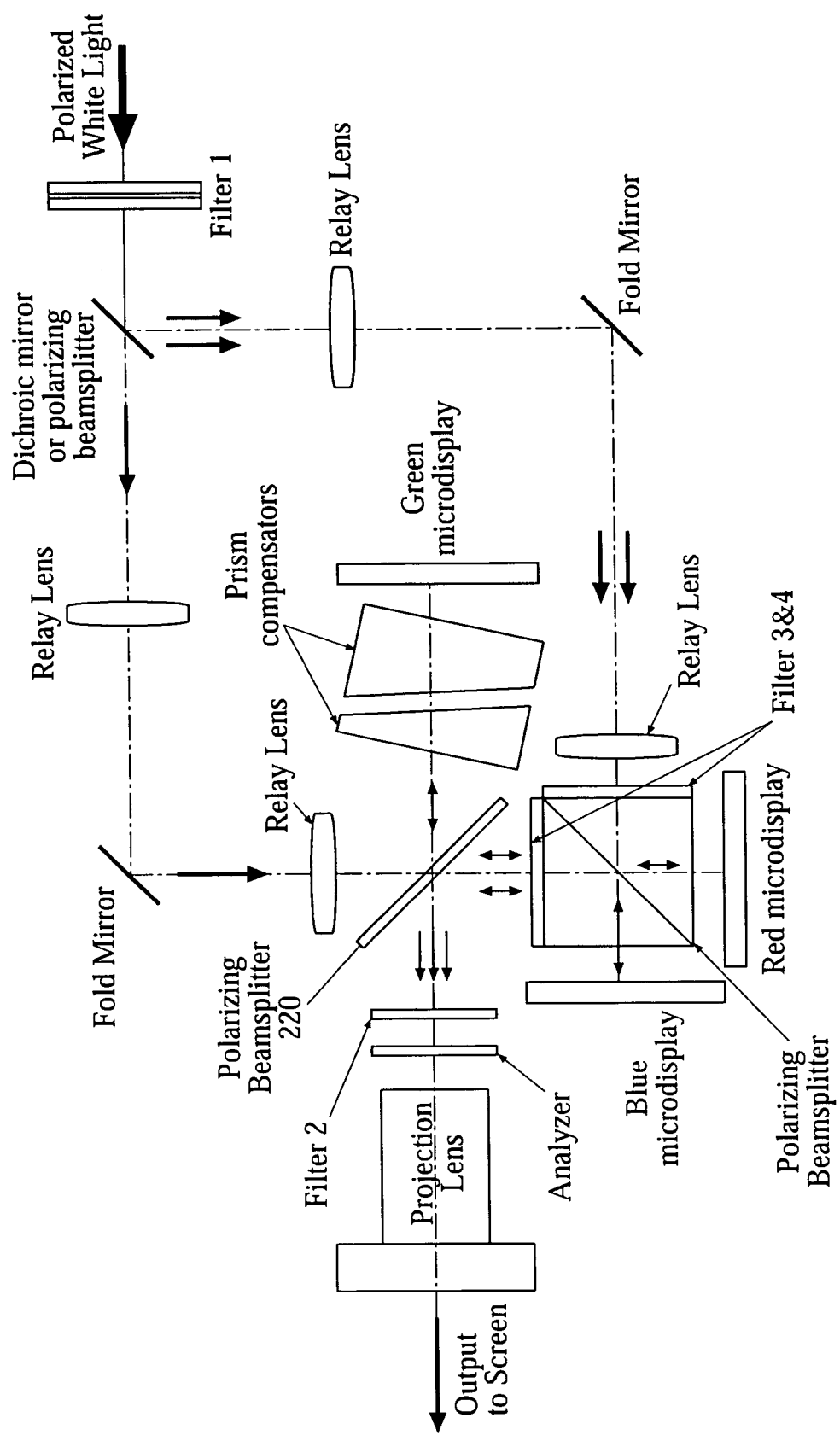
FIG. 7 illustrates a three-panel color management system in accordance with yet another exemplary embodiment of the present invention, wherein the light separator may be either a dichroic mirror or a polarizing beamsplitter, and wherein the first light beam is received by the compensating prism group after being reflected by a polarizing beamsplitter, wherein the second light beam does not encounter the polarizing beamsplitter before being received by the image assimilator, and wherein the image assimilator comprises a filter for selectively rotating a component as well as a polarizing beamsplitter.
Figure 9:
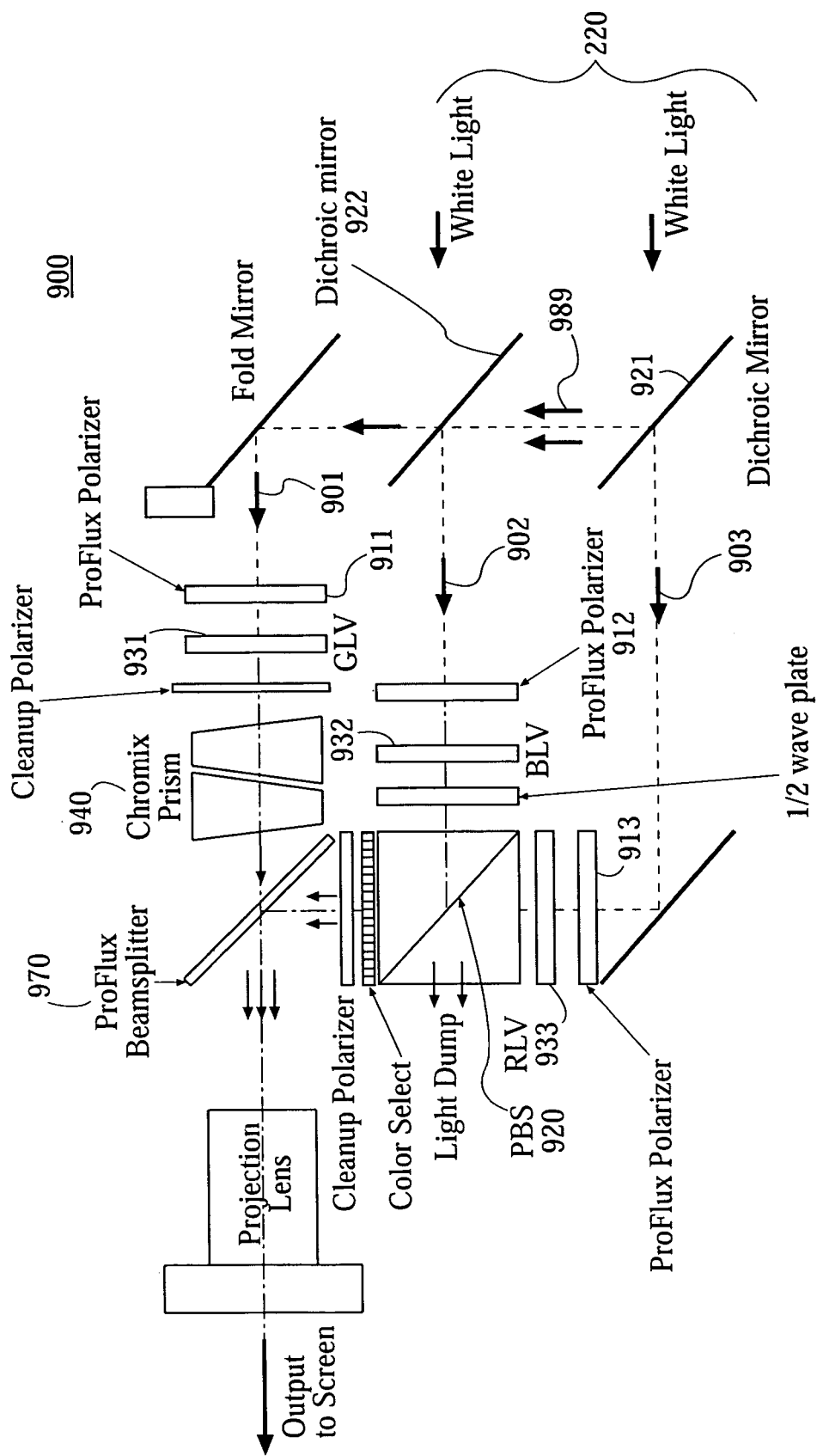
FIG. 9 illustrates a three-panel pass through color management system in accordance with yet another exemplary embodiment of the present invention, wherein the light separator comprises a plurality of dichroic mirrors, and wherein spatial information is imparted on each of the three light beams by a red transmissive light valve, a green transmissive light valve, and a blue transmissive light valve prior to recombination through two polarizing beamsplitters. Appropriate transmissive light valves may be chosen from a variety of different available sizes and resolutions to suit the needs of the particular application and are readily commercially available as manufactured by both the Sony and Epson corporations.

As shown in FIG. 7, the light separator may be either a dichroic mirror or a polarizing beamsplitter. In addition, as illustrated in FIG. 7, the first light beam may be received by the compensating prism group after being reflected by a polarizing beamsplitter, wherein the second light beam does not encounter the polarizing beamsplitter before being received by the image assimilator, and wherein the image assimilator comprises a filter for selectively rotating a component as well as a polarizing beamsplitter. Alternatively, as shown by FIG. 9 the light separator may comprise a plurality of dichroic mirrors As shown in FIG. 6, filter 215 is configured for receiving a linear polarized light input 210 and selectively rotating the polarization component of the light input 210 to produce a light input 217 comprising polarized light oriented in a first plane and polarized light oriented in a second plane. In accordance with this embodiment, the polarized light oriented in the first plane comprises a first color component, such as green light; the polarized light oriented in the second plane comprises both a second color component and a third color component such as red and blue light.

Polarizing beamsplitter 220 is positioned to receive the first polarized light output 217 from the first filter 215. It should be noted that a polarizing beam splitter 220 is a device configured to separate an incipient beam of light into two emergent linear polarized beams of light. As such, polarizing beamsplitter 220 may comprise a dichroic mirror having a coating configured to separate light into components of different colors. For example a typical coating may be a thin film dielectric coating. Alternatively, polarizing beamsplitter 220 may be a dielectric beamsplitter having a coating configured to separate light into different components base upon color or polarization.

Figure 3:
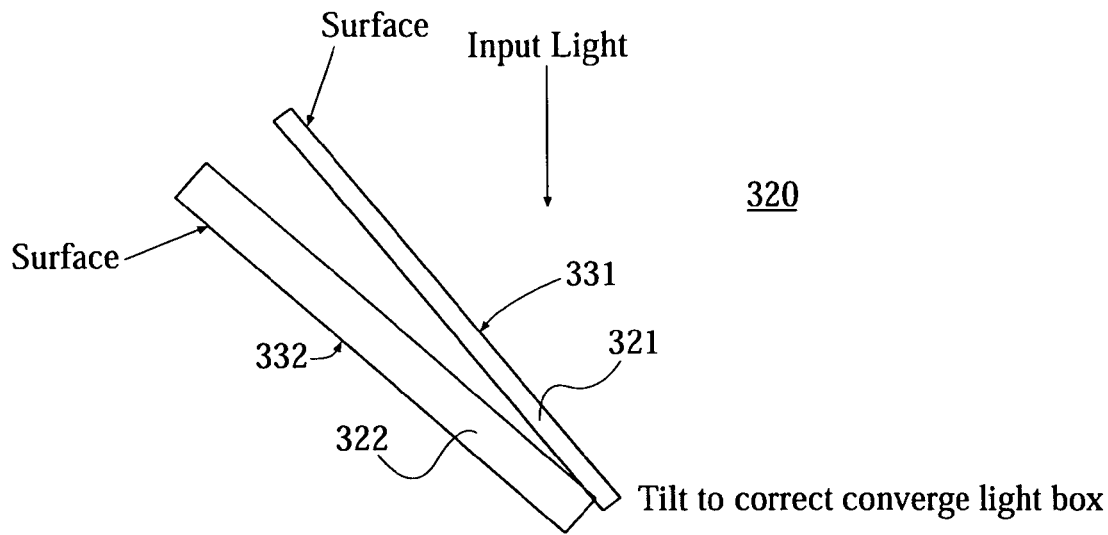
FIG. 3 illustrates a polarizing beamsplitter in accordance with an exemplary embodiment, wherein the polarizing beamsplitter comprises a pair of tilted polarizing beamsplitters having their active surfaces facing substantially away from one another.

As shown in FIG. 3, polarizing beamsplitter 220 may comprise two or more polarizing beamsplitters 321, 322 having their active surfaces facing substantially away from one another so as to further improve contrast and minimize stress birefringence such as that caused by uneven thermal loading. The plurality of polarizing beamsplitters 321, 322 optionally may be tilted with respect to one another to compensate for any offset between the associated light beams, such as that which may be caused by the finite and/or differing thickness of each of the polarizing beamsplitters. It should be noted that such a plurality of polarizing beamsplitters tilted with respect to one another may be useful in a variety of applications wherever it is desired to separate and recombine light with corresponding need to correct aberrations in either the incipient or the emitted light. In an exemplary embodiment, polarizing beamsplitter may comprise a single component having active polarizing beamsplitter surfaces on both sides. An example of such a polarizing beamsplitter would be an optically transmissive subtrate with Proflux™ polarizing beamsplitter surfaces on both surfaces.

In accordance with the invention, polarizing beamsplitter 220 is configured for separating the polarized light oriented in the first plane from the polarized light oriented in the second plane. In an exemplary embodiment, polarizing beamsplitter 220 may be configured to emit in a first direction the polarized light oriented in the first plane and to emit in a second direction the polarized light oriented in the second plane, wherin the second direction is substantially orthogonal to the first direction. In another exemplary embodiment, polarizing beamsplittet 220 may be configured to transmit the polarized light oriented in the second plane and to reflect the polarized light oriented in the first plane.

Alternatively, as shown in FIG. 7, polarizing beamsplitter 220 may be configured to reflect the polarized light oriented in the second plane and to transmit the polarized light oriented in the first plane. In accordance with this embodiment, a plurality of fold mirrors may be employed to direct the various light beams between the elements of the color management system. As used herein, a fold mirror refers to any reflective surface capable of reflecting light. For example, fold mirror may be a aluminized mirror or an enhanced silver mirror as produced by Unaxis company of Liechtenstein. As shown in FIG. 3, polarizing beamsplitter 320 may comprises a pair of polarizing beamsplitters 321, 322 having their active surfaces 331, 332 facing substantially away from one another, or a single polarizing beamsplitter component with active surfaces on both sides.

With reference to FIG. 6, image assimilator 550 may be positioned to receive from polarizing beamsplitter 220 polarized light oriented in the second plane. Image assimilator 550 may be configured for separating the second component from the third component and transmitting the second component to be received by a second microdisplay 532 and the third component to be received by a third microdisplay 533. In addition, image assimilator 550 may be further configured for receiving a modified second component from the second microdisplay 532 and receiving a modified third component from the third microdisplay 533. Finally, the image assimilator 550 may be configured to emit an assimilated light output to be received by the polarizing beamsplitter 270, the assimilated light output comprising the modified second component and the modified third component. In an exemplary embodiment, the equivalent optical path length associated with the glass or other optical material of the image assimilator 550 may be determined so that compensating characteristics may be incorporated into appropriate system elements such as compensating prism group 240.

Figure 5:
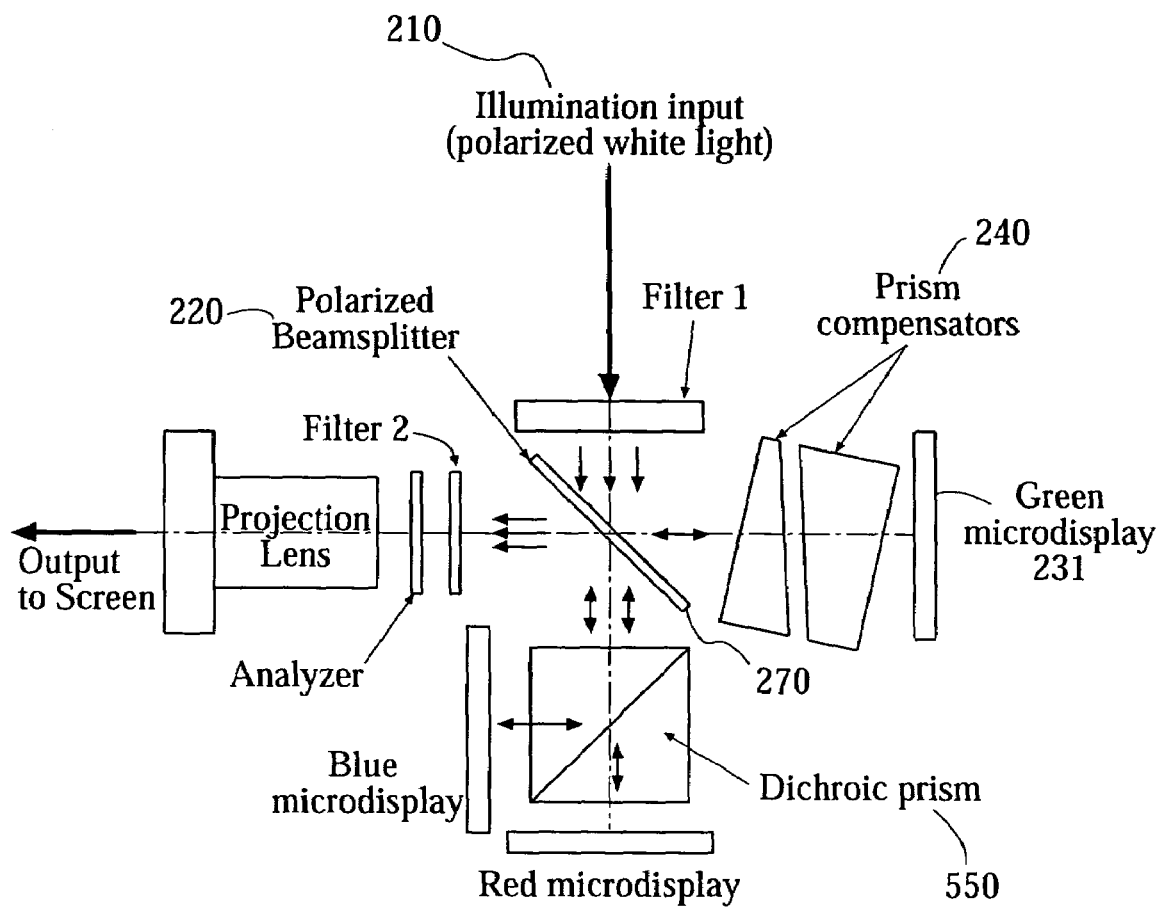
FIG. 5 illustrates a three-panel color management system in accordance with yet another exemplary embodiment of the present invention, wherein the image assimilator is a dichroic prism and the output is further enhanced by an output filter and an analyzer.

In an exemplary embodiment, as shown in FIGS. 5 and 6, image assimilator 550 comprises a dichroic prism. In an alternative embodiment, as shown in FIG. 4, image assimilator 450 may be a substantially equal path length prism. In another exemplary embodiment, image assimilator 550 may comprise a polarizing filter for producing a differentiated light output comprising the second component and the third component, where the orientation of the second component is rotated to be orthogonal to the orientation of the third component. In accordance with this alternative embodiment, the image assimilator 550 further comprises a second polarizing beamsplitter positioned to receive from the polarizing filter the differentiated light output. This second polarizing beamsplitter is configured for separating the second component from the third component before transmitting the second component to be received by the second microdisplay and before transmitting the third component to be received by the third microdisplay.

Compensating prism group 240 is positioned to receive the light oriented in the first plane from the polarizing beamsplitter 220. Compensating prism group 240 may comprise a pair of prism compensators and is configured to transmit a first component to be received by a first microdisplay and for receiving a modified first component from the first microdisplay. In addition, compensating prism group 240 is configured to emit a light output, which comprises the modified first component oriented in the second plane, to be received by the polarizing beamsplitter 220. In accordance with an exemplary embodiment, compensating prism group 240 is configured to exhibit an equivalent optical path length substantially equal to that of the image assimilator 550. In an exemplary embodiment, the prism compensators of compensating prism group 240 are arranged to be separated by an air gap configured to compensate for one or more optical aberrations produced by the polarizing beamsplitter 220.

In another exemplary embodiment, as shown in FIG. 2, compensating prism group 240 may exhibit a tilted orientation such that its surface facing polarizing beamsplitter 220 is tilted with respect to a plane that lies orthogonal to the most direct path from compensating prism group 240 to polarizing beamsplitter 220. In another exemplary embodiment, as shown in FIG. 4, compensating prism group 240 may further comprise a tilted compensator plate exhibiting a tilted orientation such that its surface facing polarizing beamsplitter 220 is tilted with respect to a plane that lies orthogonal to the most direct path from tilted compensator plate to polarizing beamsplitter 220.

In an exemplary embodiment, as shown in FIG. 5, the output may be further enhanced by an output filter and or an analyzer positioned to receive the modified light outputs from image assimilator 550 and compensating prism group 240 and to further modify the light to produce polarized light oriented in a single plane, i.e., substantially linearly polarized light, which may be accomplished by rotating the polarization axis of one or more of the light beams. In accordance with this exemplary embodiment, the color management system 200 may comprise an analyzer positioned to receive the light emitted from this second filter so as to produce a sharpened comprehensive light output having an improved contrast relative to the light emitted from the second filter. In yet another exemplary embodiment, the analyzer may be configured for removing light of a predetermined wavelength from the light beam, depending on the characteristics of the filters (i.e., the color selective retardation elements). Finally, it should be noted that the light beam emitted from the color management system 200 may be magnified through a projection lens for projection of an image.

Figure 8:
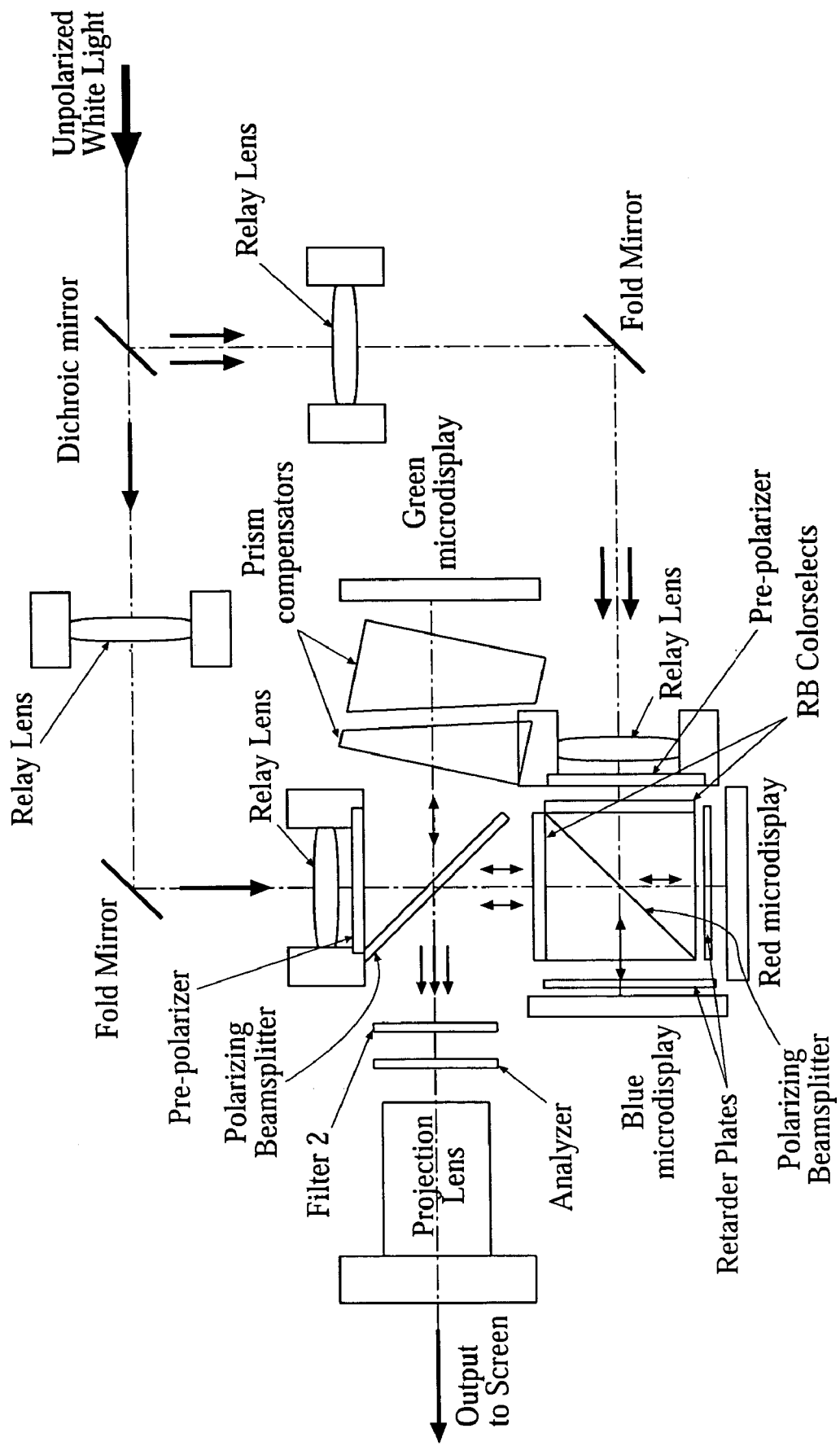
FIG. 8 illustrates a three-panel color management system in accordance with yet another exemplary embodiment of the present invention, wherein the light separator is a dichroic mirror, and wherein retarder plates are positioned to receive and improve light beams prior to their receipt by the blue and red microdisplays.

As illustrated in FIG. 6, a color management system may improve its ability to handle increased light flux requirements while maintaining or decreasing physical size by incorporating a plurality of field lenses positioned to receive and focus the component light beams so as to reduce the diameter of those light beams. Still further, as shown in FIG. 8, the system may comprise one or more retarder plates positioned to receive and improve light beams prior to their receipt by the blue and/or red microdisplays.

In an exemplary embodiment, as shown in FIG. 6, color management system 200 may include one or more field lens 610, each lens 610 positioned to receive a linearly polarized beam of light and to focus it prior to receipt of a light beam by a microdisplay and/or after transmission by a microdisplay. In accordance with this embodiment, the light beam may be focused into a more compact output beam, enabling effective use of smaller projection lenses while maintaining equivalent or even increased levels of light flux.

In accordance with this embodiment, the filter 215 receives a substantially linearly polarized light input 210 and selectively rotates a component of the polarized light input to emit light oriented in two planes 217. The polarizing beamsplitter 220 receives the bi-oriented light 217 and separates it into two substantially linearly polarized light outputs, one comprising a single component and the other comprising two components. The image assimilator 550 receives from the polarizing beamsplitter 220 the output light having two components and further separates the light into two light outputs, each comprising one of the two components. The image assimilator 550 then transmits each of the light outputs to corresponding microdisplays 532 and 533 and receives a modified output from each of the microdisplays. Finally, the image assimilator 550 produces an output comprising the modified outputs from the microdisplays. The compensating prism group 240 receives the single color light output from the polarizing beamsplitter 220 and transmits the light to another corresponding microdisplay 231. Then, the compensating prism group 240 receives a modified light output 259 from the microdisplay 231 and transmits it to be combined with the light output from the image assimilator 550.

It should be noted that the color management system 200 of the instant invention may be adapted for use in a one panel system as depicted in FIG. 2, in a dual panel system as illustrated in FIG. 4, or in a three panel system, as illustrated in FIGS. 5 through 9, by appropriate replacement of image assimilator 550 with compensating prism groups. Further still, as shown by FIG. 9, the system of the present invention may be implemented as a pass through system 900, wherein spatial information may be imparted on each of the three light beams 901, 902, and 903 by a green transmissive light valve 931, and a blue transmissive light valve 932, and a red transmissive light valve 933, prior to recombination through two polarizing beamsplitters 920 and 970. In accordance with this embodiment, an exemplary color management system includes a light separator 220 comprising a first dichroic mirror 921 and a second dichroic mirror 922, wherein said first dichroic mirror 921 is positioned to receive said light input and is configured for separating said first component from said second component and emitting a first light beam 903 comprising said first component and a second light beam 989 comprising said second component, wherein said second dichroic mirror 922 is positioned to receive said second light beam 989 and is configured for separating said second component from said third component and emitting a refined second light beam 902 comprising said second component and a third light beam 901 comprising said third component, wherein said first light beam 903 is to be received by a first polarize 913 configured for producing a first polarized light beam, said refined second light beam 902 is to be received by a second polarize 912 configured for producing a second polarized light beam, and said third light beam 901 is to be received by a third polarize 911 configured for producing a third polarized light beam, said color management system further comprising a red light valve 933 positioned to receive said first polarized light beam and configured for emitting a polarized red light beam to be received by said image assimilator 920, said color management system further comprising a blue light valve 932 positioned to receive said second polarized light beam and configured for emitting a polarized blue light beam to be received by said image assimilator 920, said color management system further comprising a green light valve 931 positioned to receive said third polarized light beam and configured for emitting a polarized green light beam to be received by said compensating prism group 940. Finally, said compensating prism group 940 emits a compensated output to be combined, by beamsplitter 970, with an assimilated output produced by the polarizing beamsplitter 920, which comprises the polarized blue light beam and the polarized red light beam. In an exemplary embodiment, the output from beamsplitter 920, which comprises the polarized blue light beam and the polarized red light beam, passes through a color select filter and a cleanup polarize before being combined with the output of beamsplitter 970 and being transmitted to a projection lens to be output to project an image.

Accordingly, the present invention utilizes both polarization dependent elements and dichroic elements to split an input light into a plurality of color bands upon which spatial information may be superimposed by a corresponding plurality of microdisplays, the modified color bands being recombined to produce a full color projected image.

The present invention has been described above with reference to various exemplary embodiments. However, those skilled in the art will recognize that changes and modifications may be made to the exemplary embodiments without departing from the scope of the present invention. For example, the various elements may be implemented in alternate ways, such as, for example, by providing other optical configurations or arrangements. These alternatives can be suitably selected depending upon the particular application or in consideration of any number of factors associated with the operation of the system. Moreover, these and other changes or modifications are intended to be included within the scope of the present invention, as expressed in the following claims.

What is claimed is:

1. An image display device, comprising:
    a light separator positioned to receive light and configured to separate the light into a first light beam and a second light beam;
    a microdisplay configured to modify the first light beam to produce a modified first light beam; and
    a plurality of prisms positioned to receive the first light beam, configured to transmit the first light beam to the microdisplay, positioned to receive the modified first light beam from the microdisplay, and configured to emit a compensated light beam including the modified first light beam.

2. The image display device of claim 1, wherein the light separator includes a dichroic mirror configured to separate the first light beam from the second light beam.

3. The image display device of claim 1, wherein the light includes polarized light oriented in a first plane and polarized light oriented in a second plane.

4. The image display device of claim 3, wherein the light separator is a polarizing plate beamsplitter configured to separate the polarized light oriented in the first plane from the polarized light oriented in the second plane and emit the first light beam including the polarized light oriented in the first plane and emit the second light beam including the polarized light oriented in the second plane.

5. The image display device of claim 1, wherein the light separator includes a pair of tilted polarizing beamsplitters having their active surfaces facing substantially away from one another to improve contrast and reduce stress birefringence.

6. The image display device of claim 1, wherein at least two of the plurality of prisms are separated by an air gap.

7. The image display device of claim 6, wherein the air gap is configured to compensate for one or more optical aberrations produced by the light separator.

8. The image display device of claim 1, further comprising a compensator plate positioned adjacent to at least one of the plurality of prisms.

9. The image display device of claim 8, wherein the compensator plate is tilted at an angle of between −30 degrees and +30 degrees with respect to a plane that lies orthogonal to the most direct path from the compensator plate to the light separator.

10. An image display device, comprising:
    a light separator positioned to receive light and configured to separate the light forming a first light beam and a second light beam;
    a first microdisplay positioned to receive the first light beam and configured to superimpose spatial information on the first light beam to produce a modified first light beam;
    a prism group positioned to receive the modified first light beam from the first microdisplay, configured to compensate for an optical aberration introduced by the light separator, and configured to emit a compensated light beam; and
    a second microdisplay positioned to receive the second light beam and configured to superimpose spatial information on the second light beam to produce a modified second light beam.

11. The image display device of claim 10, wherein the light separator is selected from a group consisting of a dichroic mirror, a dichroic prism, and a polarizing beamsplitter.

12. The image display device of claim 10, further comprising a prism positioned adjacent to the second microdisplay.

13. The image display device of claim 12, wherein the prism group has an optical path length that is substantially equal to an optical path length of the prism.

14. The image display device of claim 10, wherein the prism group is configured to emit a compensated light beam having a polarization state.

15. The image display device of claim 14, further comprising a color select filter configured to rotate the polarization state of the compensated light beam and configured to combine the compensated light beam and the modified second light beam to produce an output light beam having a substantially uniform polarization state.

16. The image display device of claim 10, further comprising a field len positioned to receive the first light beam and configured to decrease a cross-sectional diameter of the first light beam.

17. The image display device of claim 10, wherein the first light beam is emitted in a first direction and the second light beam is emitted in a second direction, the first direction being substantially orthogonal to the second direction.

18. An image display device, comprising:
    a first polarizing beamsplitter configured to reflect a first light beam and configured to transmit a second light beam;
    a first microdisplay positioned to receive the first light beam and configured to superimpose spatial information on the first light beam to produce a modified first light beam;
    a prism group positioned to receive the modified first light beam from the first microdisplay and configured to compensate for an optical aberration;

a second microdisplay positioned to receive the second light beam and configured to superimpose spatial information on the second light beam to produce a modified second light beam; and a second polarizing beamsplitter configured to receive the modified second light beam.

19. The image display device of claim 18, further comprising a third microdisplay positioned to receive at least a portion of the second light beam.

20. The image display device of claim 18, further comprising a retarder plate, positioned between the second microdisplay and the second polarizing beamsplitter, to compensate for an optical aberration introduced by the second microdisplay.

21. The image display device of claim 18, further comprising a color select filter, positioned optically between the first polarizing beamsplitter and the second polarizing beamsplitter, to rotate the polarization state of at least a portion of the second light beam.

22. The image display device of claim 18, further comprising a color select filter configured to rotate the polarization state of the modified first light beam and configured to combine the modified first light beam and the modified second light beam to produce an output light beam having a substantially uniform polarization state.

23. The image display device of claim 22, further comprising an analyzer, positioned adjacent to the first polarizing beamsplitter, for filtering the output light beam.

* * * * *